United States Patent [19]

Tribuno et al.

[11] 3,815,850
[45] June 11, 1974

[54] CRAB ANGLE REFERENCE SIGNAL DEVELOPMENT FOR LIMITED FORWARD SLIP LANDING MANEUVER

[75] Inventors: Robert F. Tribuno, Santa Monica, Calif.; Jimmie L. Foster, Marion, Iowa

[73] Assignee: Collins Radio Company, Dallas, Tex.

[22] Filed: Nov. 24, 1972

[21] Appl. No.: 309,308

[52] U.S. Cl...... 244/77 A, 235/150.22, 235/150.26, 244/77 B
[51] Int. Cl. ............................................. B63c 13/18
[58] Field of Search...73/178 R; 235/150.22, 150.26; 244/3, 19, 77 A, 77 B, 77 C, 77 E; 340/72 NA; 343/108 R

[56] References Cited
UNITED STATES PATENTS

| | | | |
|---|---|---|---|
| 3,266,753 | 8/1966 | Gaylor | 244/77 A |
| 3,467,344 | 9/1969 | Kramer et al. | 244/77 A |
| 3,523,663 | 8/1970 | Doniger et al. | 244/77 A |
| 3,524,612 | 8/1970 | Ainsworth et al. | 244/77 D |
| 3,552,687 | 1/1971 | Howard et al. | 244/77 A |
| 3,635,428 | 1/1972 | Nelson et al. | 244/77 A |

*Primary Examiner*—Milton Buchler
*Assistant Examiner*—Stephen G. Kunin

[57] ABSTRACT

A signal processing apparatus for developing a yaw command signal as might be advantageously employed in effecting decrab prior to touchdown. The signal is formulated from utlizing course datum prior to decrab to reference an integrator to which yaw rate is applied during decrab. A limiter processes the yaw command signal to establish a maximum permissible decrab maneuver.

7 Claims, 5 Drawing Figures

CRAB ANGLE REFERENCE SIGNAL DEVELOPMENT FOR LIMITED FORWARD SLIP LANDING MANEUVER

This invention relates generally to aircraft control and more particularly to improvements in the landing performance of an aircraft.

Systems effecting a wing down into the wind forward slip landing maneuver are employed in the art. These systems generally provide means for decrabbing the aircraft prior to touchdown and employ a roll command signal development upon decrab to counteract the normal tendency of the aircraft to be flown off course. Thus runway alignment and localizer on-course conditions are maintained. Systems employing forward slip maneuvers must limit the amount that the wing may be caused to dip into the wind for obvious safety reasons. For example at altitudes just prior to touchdown, the amount of permissible wing down to effect a forward slip maneuver is limited by factors such as wing span, engine pod positions, etc.

Thus a forward slip maneuver to maintain runway alignment prior to touchdown necessitates that a limit be imposed upon the number of degrees of wing down (bank) which will be allowed for crosswind compensation at decrab initiation. Additional crosswind compensation at decrab initiation is provided by a commanded crab angle. The wing down limit at decrab initiation is effected indirectly by commanding a precomputed decrab.

In accordance with the present invention means are employed to limit the amount of decrab per se, which amount of decrab bears a definable relationship in establishing a wing down angle at decrab initiation height. Below decrab initiation height changing crosswind conditions are compensated by wing down variation up to a maximum bank angle limit imposed by the roll axis computations.

The present invention is accordingly featured in the provision of means for memorizing the aircraft crab angle existing at the point of decrab initiation and to so limit the application of a signal proportional to said memorized crab angle as a yaw steering command presented to either a pilot or autopilot, that a wing down maneuver in response thereto is limited to a predetermined maximum number of degrees.

The present invention is further featured in the provision of means for deriving a course datum signal for yaw command that is more accurate than that which could be formulated from compass input information alone. The system utilizes course datum information (the discrepancy between the localizer course and the experienced heading of the aircraft) to reference a heading deriver integrator from which a subsequent integration of aircraft yaw rate input signal, applied at the instant of decrab trip point attainment, provides a course datum signal indicative of aircraft crab angle.

The present invention is further featured in the provision of a cross-fed of decrab (yaw) command to roll command formulation circuitry at the decrab initiation based on memorized crab angle such that the roll command includes wing down anticipation to minimize time required to establish the required wing down angle.

These and other features and objects of the present invention will become apparent upon reading the following description with reference to the accompanying drawings in which.

The present invention will be described as it might be employed in a decrab-foward slip maneuver command signal formulation of an improved runway alignment system employing lateral acceleration in the command formulation, as described in copending application Ser. No. 309,307, filed Nov. 24, 1972 entitled "Runway Alignment System Utilizing A Lateral Acceleration Signal" by Edwin R. Hattendorf and Elmer L. Schultz, assignees to the assignor of the present invention. (now U.S. Pat. No. 3,761,691) This described usage is by way of example only and not by way of limitation, since the signal formulation of the present invention is equally applicable to, and might be advantageously employed in, forward slip maneuver command signal formulations which involve a combination of forward slip and crab to provide crosswind compensation. In such systems, the present invention provides a source of crab angle reference which will effect a steady state wing down into the wind, in addition to providing an anticipating roll command signal for the maneuver.

The above-referenced copending application defines the formulation of a roll steering command to a pilot or autopilot by means of which an aircraft decrab and forward slip maneuver is commanded to prevent the aircraft from being blown off-course (off centerline) when the decrab maneuver is initiated at a predetermined altitude. In this control system, a lateral acceleration signal sensed upon initiation of the decrab is so mixed with localizer radio and roll gyro information in the formulation of a roll steering command that the aircraft is caused to wing down into the wind an amount sufficient to offset the tendency of the aircraft to be blown off course by the wind when the aircraft is decrabbed.

The amount of aircraft crab angle existing at a predetermined altitude during a landing maneuver is, of course, directly related to the existing wind vector, air speed, and other parameters. Thus, to effect a decrab to zero crab angle would cause aircraft wing down in proportion to the initial crab angle and could lead to disastrous results in the absence of some form of limiting to ensure that the wing down maneuver responsive thereto is safe. The amount of wing down that can be tolerated by a given air frame when touchdown is imminent is of course dependent upon the aircraft physical dimensions such as wing span, location and dimension of engine pods, as well as the landing gear placement and physical dimensions.

Accordingly the present invention provides for the formulation of a yaw steering command to effect aircraft decrab at a particular altitude trip point. The yaw steering command is limited such that an aircraft decrab maneuver sufficient to cause a wing down command in excess of a predetermined number of degrees of roll is prevented. In essence, the amount of permissible decrab is limited.

Figure 5:
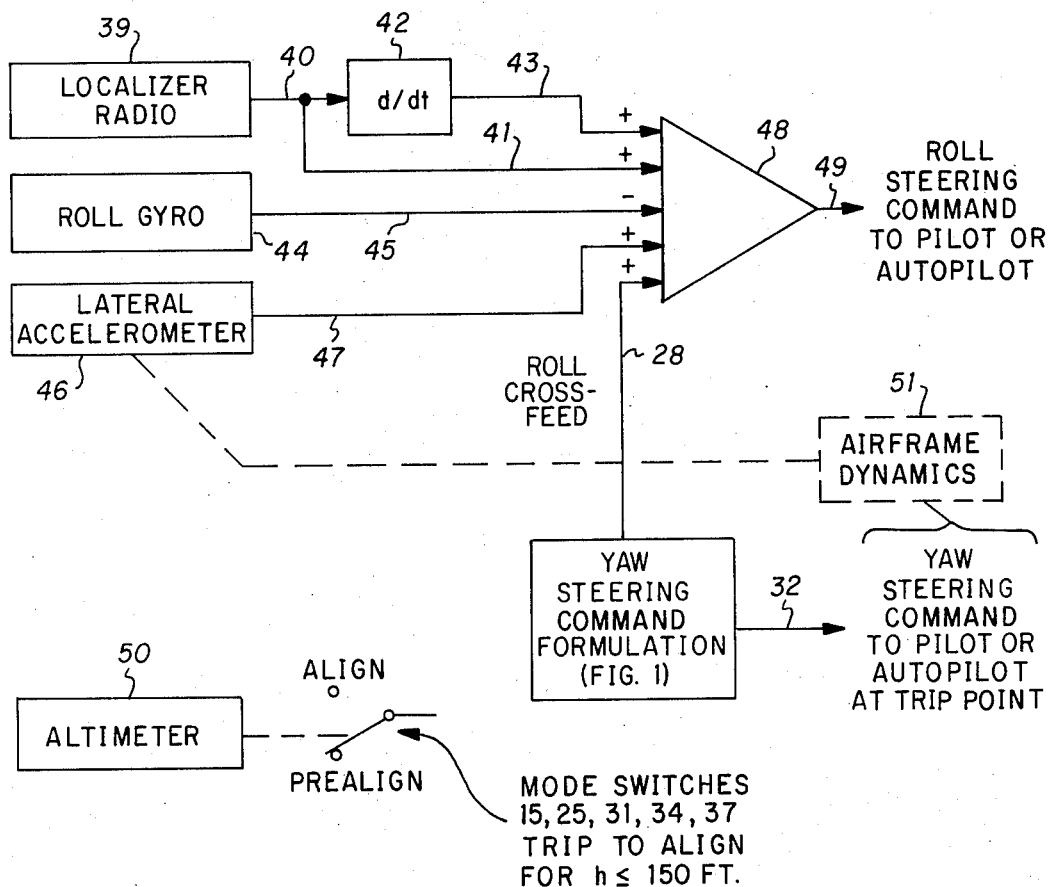
FIG. 5 is a functional block diagram of a forward slip landing maneuver control system in which the limited decrab feature of the present invention may be utilized.

A runway alignment system which might utilize the yaw command signal formulated in accordance with the present invention is depicted functionally in FIG. 5. As described and claimed in the above-referenced copending application, a roll steering command signal 49 is formulated from appropriate mixing in a mixing device 48 of a displacement signal 41 which might stem from a localizer radio 39 together with a rate of change of this displacement signal (input 43), and a roll or bank attitude signal 45, stemming from roll gyro 44. The roll or bank attitude signal corresponds to position feedback in a conventional servo control system. The localizer radio 39 supplies a signal 41 for direct application to mixing device 48. Signal 41 might be applied through a differentiating network 42 to provide a signal 43 corresponding to the rate of change of the displacement signal 41. The roll gyro 44 supplies a bank attitude signal 45 to the mixing device 48.

The system of FIG. 5 further illustrates the application of a further signal being applied to the summing device 48 in the form of low-passed lateral acceleration. A lateral accelerometer 46 develops a lateral acceleration signal 47 which might be applied through a low-pass filter as a further input 47 to the mixing means 48.

As defined in the above-referenced copending application, in the steady state condition when the aircraft is approaching the runway, the output from lateral accelerometer 46 is zero, inferring an on-course approach. A decrab maneuver effected at a predetermined altitude (i.e., 150 feet) may be initiated either automatically or pilot induced by utilization of a source of course datum signal 32. The course datum signal, in the steady state condition, represents the crab angle of the aircraft with respect to the runway alignment reference. The course datum signal conventionally represents the difference between the predetermined or preselected course (i.e., the localizer course) and the aircraft heading being experienced. In response then to the application of the yaw steering command signal at a predetermined trip point, as determined by an altimeter 50 in conjunction with appropriate switching means, the airframe has imparted thereto a lateral acceleration as the aircraft decrabs, due to the wind blowing the aircraft off the localizer course. This lateral acceleration is sensed by lateral accelerometer 46 and so mixed in the formulation of the roll steering command formulation circuitry that a wing down into the wind attitude is commanded to counteract the tendency of the wind to blow the aircraft off course.

In accordance with the present invention, and as above discussed, the formulation of the yaw steering command signal (which relates to the aircraft crab angle existing at the time of the decrab maneuver) is processed and limited so as to ensure that the aircraft wing down maneuver in response to aircraft decrab is less than a predetermined number of degrees.

Figure 1:
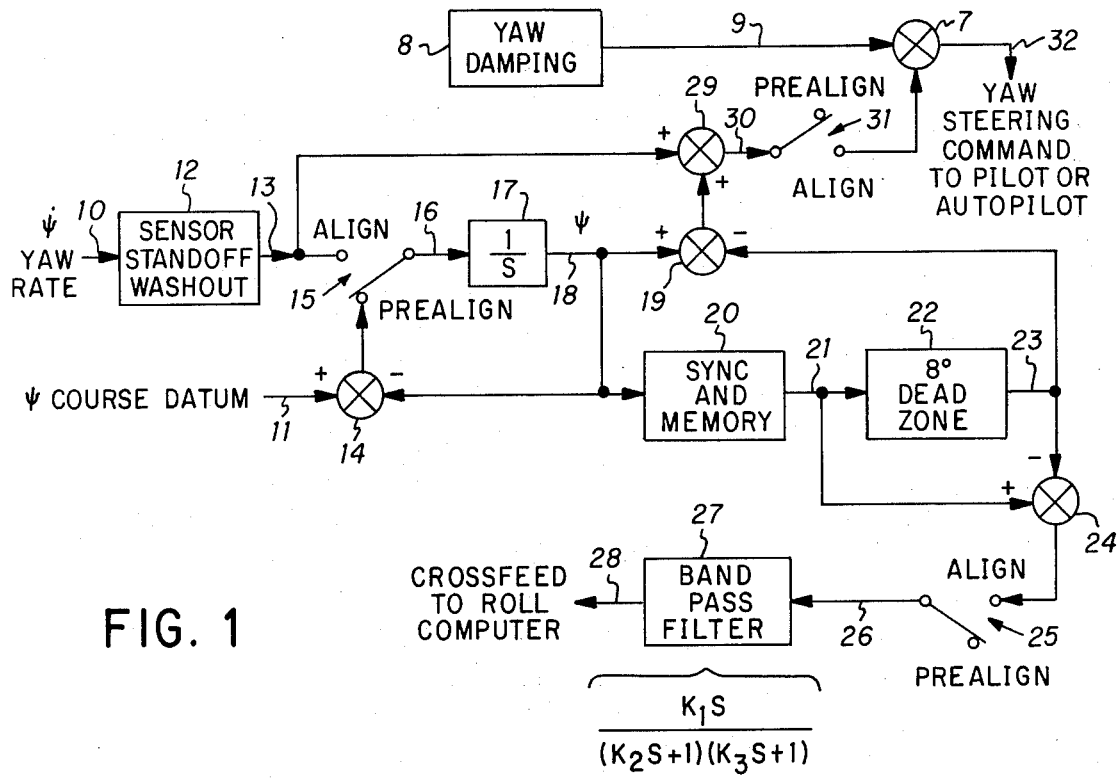
FIG. 1 is a functional diagram illustrating the development of a yaw steering command signal in accordance with the present invention.

The formulation of the yaw steering command signal in accordance with the present invention is depicted functionally in FIG. 1. With reference to FIG. 1, the yaw steering command signal to effect decrab at a predetermined altitude during the landing maneuver is, as in the above-referenced copending application, formulated from a course datum input signal 11 and a yaw rate or course datum rate input signal 10. In accordance with the present invention, however, the course datum signal (which in the steady state condition is proportional to the aircraft crab angle) is processed in a particularly advantageous manner including limiting features such as to assure that the resulting wing down maneuver in response to application of the yaw steering command to effect decrab does not exceed a predetermined value. As will be further described, the yaw command signal formulation in accordance with the present invention assures that localizer course deviation during a forward slip maneuver is minimized by a crossfeed to roll command at the initiation of forward slip based on memorized crab angle. The employment of memorized crab angle to bank command is primarily intended to force the aircraft bank to compensate for cross-wind a little faster and does not remain in the computations. The system further advantageously utilizes compass information (course datum) to reference integrators to an average course datum (crab angle) reference during a prealign mode of operation and utilizes integrated course datum rate (yaw rate) to modify this memorized reference from the instant in time at which the decrab maneuver is effected. The system is thus immune during the critical decrab maneuver to erratic variations in compass output information per se since the yaw rate signal is developed by sensing of true rates and thus immune to anomalies inherently present in a compass derived heading signal.

The yaw steering command signal formulation to be described incorporates two operational modes defined as ALIGN and PREALIGN modes. The PREALIGN mode is effected by and responsive to conditions existing during the steady state phase of aircraft descent during a landing when the aircraft is above a predetermined altitude. At a predetermined altitude (trip point) the ALIGN mode is effected and the aforedescribed decrab maneuver is commanded. Thus the yaw steering command formulation circuitry depicted functionally in FIG. 1 incorporates ALIGN-PREALIGN mode switches which (as depicted functionally in FIG. 5) are positioned in accordance with experienced aircraft altitude.

With reference to FIG. 1, yaw rate signal 10 might be applied to a sensor standoff washout circuitry 12 to provide a yaw rate signal 13 for application to an output mixer 29. A second input to output mixer 29, applied in a subtractive sense, is developed as the output from a further mixing means 19 and corresponds to a course datum signal which defines (as by synchronization) the existing aircraft crab angle. A yaw damping function 8 is then conventionally added to the output of the signal combining means 29 to formulate the yaw steering command signal in combining means 7.

In the PREALIGN mode depicted in FIG. 1 course datum input signal 11 is applied to signal mixing means 14 which comprises a portion of a closed loop heading deriver circuitry comprising an integrator 17 to which is applied the output from mixer 14 and which supplies a feed-back 18 as a second subtractive input to mixer 14. Thus the heading deriver circuitry forces the output 18 from integrator 17 to a signal value equal to the course datum input signal 11 since the input to integrator 17 becomes zero when the output 18 from integrator 17 builds up sufficiently to cancel out and thus equate to the course datum input signal 11. The course datum signal 18 appearing on the output of integrator 17 is applied as a first input to a further mixer 19 and additionally through a synchronizing and memory circuitry 20. The output 21 from synchronizer and memory circuitry 20 is applied as input to a dead-zone signal translating means 22 the output 23 of which is applied as a subtractive second input to mixer 19. The input 21 and output 23 from the dead-zone signal translating means 22 are applied as respective inputs in a mutually subtractive manner to a further mixer 24. The output from mixer 24 is applied (in the ALIGN mode) as an input 26 to bandpass filter 27. The output 28 from bandpass filter 27 may be, as will be further described, utilized as a cross feed to the roll command computer of the control system generally depicted in FIG. 5.

The output 23 from dead-zone signal translating means 22 and the derived course datum signal 18 appearing at the output of integrator 17, applied in a mutually subtractive sense to mixer 19, provide an output from mixer 19 to the system output mixer 29 in the form of a yaw steering command signal limited in a manner to assure that the aircraft wing down maneuver commanded thereby in the general system of FIG. 5 does not exceed a predetermined number of degrees.

Neglecting the limiting features of the yaw steering command signal development of the present invention for the moment, it is apparent that once integrator 17 has developed an output signal 18 corresponding to the course datum signal 11 applied during PREALIGN mode, a decrab maneuver effected upon ALIGN mode being tripped at a predetermined altitude of (for example) 150 feet applies a yaw rate signal 10 to the signal stored in integrator 17 through mode switch 15, and thus the derived heading signal appearing at the output 18 of integrator 17 is always integrated from its initial reference position corresponding to aircraft crab angle towards zero. Yaw command output 18 is then reduced in a smooth manner from a value synchronized to crab angle at time of ALIGN mode initiation toward zero. It is apparent, then, that in the absence of the function of mixer 19 and the limiting functions provided by sync and memory circuitry 20 and dead-zone signal translating means 22, the output 18 from integrator 17 could comprise a yaw command signal for application to output mixer corresponding to crab angle reference from course datum prior to PREALIGN mode and integrated smoothly downward from that reference value in accordance with the sensed yaw rate after decrab.

In accordance with the present invention, however, the above-described heading signal 18 is not applied directly to the output signal mixer 29 but rather is further mixed with the input from circuit means which place a limit on the amplitude of the yaw command signal as applied to the output mixer 29. As above described this limit is correlated to that number of degrees of decrab which effects an aircraft lateral acceleration allowing no more than a predetermined number of degrees of wing down into the wind to effect the forward slip maneuver desired.

With reference to FIG. 1, the output 18 from integrator 17 is applied as a first input to mixing means 19 and additionally as an input to the synchronizing and memory circuitry 20. Circuitry 20 functions to memorize the value of course datum signal developed in integrator 17 during PREALIGN mode and to hold this value at its output 21 during the ALIGN mode operation.

Figure 4:
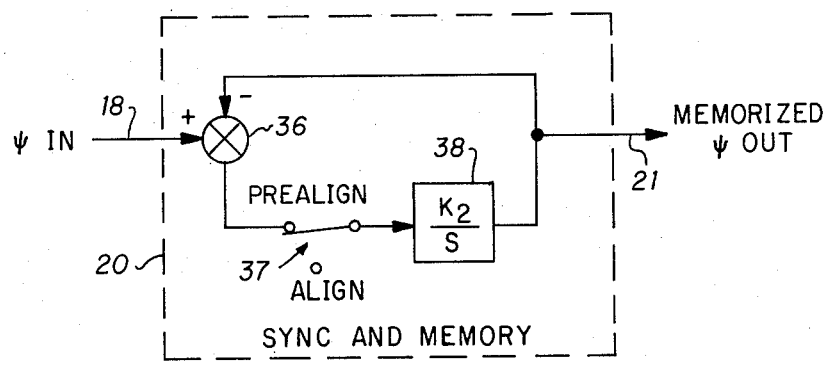
FIG. 4 illustrates functionally a type of synchronizing and memory circuitry which may be employed in the arrangement of FIG. 1.

Reference is made to FIG. 4 which illustrates a type of sync and memory circuitry which might be embodied as functional block 20 of FIG. 1. The course datum signal developed at the output 18 of integrator 17 in FIG. 1 is applied as a first input to a further mixing means 36. The output from mixing means 36 is applied through a further mode switch 37 (in PREALIGN position) as an input to a further integrator 38. The output 21 from integrator 38 is applied in a subtractive sense as a second input to mixer 36. The output 21 from the sync and memory circuitry 20 then follows (synchronizes to) the value of the derived heading signal 18 and, upon mode switching from PREALIGN to ALIGN mode, the output 21 remains at this memorized value. As will be further described, this memorized value is utilized in conjunction with dead-zone signal translating means 22 of FIG. 1 to effect a desired limit on the yaw command signal developed, and additionally to provide a cross feed signal for roll command computations.

Figure 2:
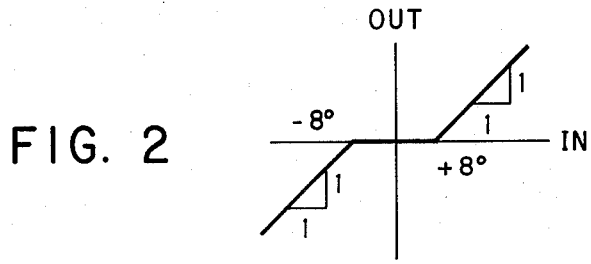
FIG. 2 illustrates the transfer characteristics of a dead-zone amplifier employed in the arrangement of FIG. 1 to effect a decrab maneuver command signal limited to ensure that an aircraft forward slip maneuver responsive thereto does not permit a wing down maneuver in excess of a predetermined number of degrees.

The transfer characteristic of the dead-zone signal translating circuitry 22 of FIG. 1 is illustrated in FIG. 2. A one to one output from dead-zone circuitry 22 is experienced only for input signals thereto in excess of a predetermined magnitude in either sense polarity, as concerns the exampled DC embodiment. As exampled, a course datum input signal from sync and memory circuitry 20 in excess of eight degrees must be attained before a one to one output is developed to the output 23 of the dead-zone signal translating circuit. Now, when the output 23 from dead-zone signal translating circuitry 22 is applied in a subtractive sense along with the derived course datum signal 18 appearing at the output of integrator 17 to mixer 19, the output from mixer 19 follows the input 18 thereto linearly for input values equal to or less than the eight degree dead-zone, and is limited at this established value for course datum signals 18 in excess of this predetermined limit. By way of example, let it be assumed that the derived course datum signal 18 at the time of mode switching to ALIGN mode from PREALIGN mode corresponds to 10° course datum (crab angle). This 10 degrees is applied as a first input to mixer 19. This 10° signal is additionally memorized by sync and memory circuit 20 and applied as an input to the dead-zone signal translating circuitry 22. With reference to the transfer characteristic depicted in FIG. 2, dead-zone circuitry 22, in response to a 10° input, produces a 2° output, and this 2° output 23 is subtractively combined with the 10° signal 18 in mixer 19 to arrive at a net yaw command signal for application to output mixer 29 of (10 - 2), or 8°. By similar consideration of yaw command signals 18 for any values equal to or in excess of 8°, the output from mixer 19 remains at the 8° limit. Course datum signals 18 less than the 8° limit established by the dead-zone translating circuit 22 result in a direct application, on a one to one basis, to output mixer 19 since the output 23 from dead-zone amplifier 22 for signals less than its established limit are inherently zero. The yaw command signal applied from mixer 19 to the output mixer 29 is limited by the dead-zone limit established by dead-zone translator 22 until the derived course datum signal 18 appearing on the output of integrator 17 is integrated down by the application of oppositely sensed yaw rate signals during ALIGN mode to a value which finally equals and then is smoothly less than that of the dead-zone limit.

It then follows that crab angles less than the limit established by the dead-zone (for example 8°) are taken out upon ALIGN mode being experienced since the complete course datum signal existing at this time will be applied as a yaw command and the subsequently experienced yaw rate, when integrated, will provide derived heading which eventually goes from 8 to zero degrees at the output of integrator 17. For existing crab angles in excess of this exampled limit of 8° the system will integrate the heading deriver integrator 17 down by a maximum of 8 degrees, leaving the difference between the experienced crab angle in excess of 8° stored in the integrator. That is to say, for existing crab angle in excess of the chosen limit, the system responds to decrab up to the set limit in number of degrees, with any crab angle in excess of the established limit remaining. This is necessary since excessive crab angles as previously described may cause yaw command signals of a magnitude which when responded to would cause excessive aircraft wing down into the wind beyond a safe margin established for a particular type of aircraft.

Figure 3:
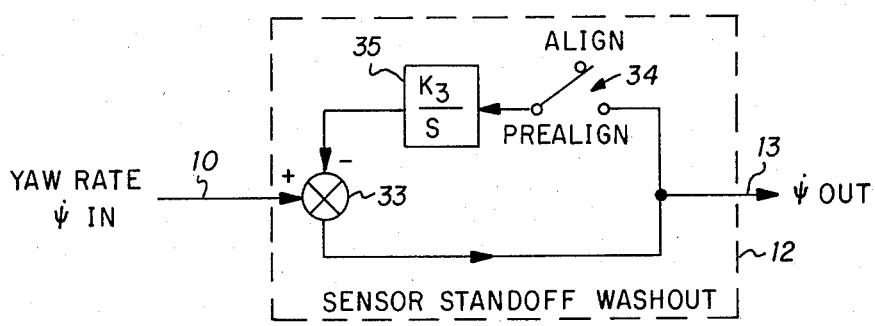
FIG. 3 represents a functional block diagram of a type of sensor standoff washout circuitry as may be employed in the arrangement of FIG. 1.

The system of FIG. 1 includes a sensor standoff washout circuitry 12 to which the yaw rate input signal 10 is applied and from which an output signal 13 corresponding to true yaw rate is utilized in ensuing computations. FIG. 3 illustrates a type of sensor standoff washout circuitry which might be employed wherein the yaw rate signal, as might be developed from a yaw rate gyro, is applied as a first input to a mixer 33. The output of mixer 33 is applied through a mode switch 34 in PREALIGN mode to an integrator 35. The output from integrator 35 is applied in a subtractive sense as a second input to mixer 33. Thus, in the PREALIGN position of mode switch 34, the output from integrator 35 is driven to the yaw rate input signal 10. Since the output of the integrator 35 and the input signal are applied in a mutually subtractive sense to mixer 33 the output 13 from mixer 33, the presence of any steady state output from the yaw rate gyro supplying yaw rate input 10 will be zero. This expedient may advantageously be included in the yaw command signal formulation since rate gyros may have a standoff output in the absence of any actual acceleration being experienced, and the system upon switching to the ALIGN mode and using integrated yaw rate in the course datum signal derivation may be made immune from an erroneous offset or standoff associated with the particular yaw rate sensor utilized. When the system switches to ALIGN mode, the integrator 35 stores the standoff signal such that the output from mixer 33 is a true indication of experienced yaw rate and devoid of offset error due to sensor standoff.

The yaw command steering signal development system of FIG. 1 further includes a means to provide an anticipating cross feed to the autopilot roll steering command computation upon the initiation of the decrab maneuver. Since the system depicted functionally in FIG. 5 effects a wing down movement in response to the lateral acceleration caused by the decrab maneuver, a slight lag may inherently be experienced between the initiation of the decrab maneuver and the actual sensing of lateral acceleration caused by this maneuver. Thus, the system of FIG. 1 applies the memorized crab angle existing at the moment of decrab (switching into ALIGN mode) as a first input to a further mixer 24 to which the output from the dead-zone signal translating circuit 22 is applied as a subtractive second input. The output from mixer 24 thus comprises a step command the magnitude of which is defined by the magnitude of the yaw steering command signal applied to output mixer 29 and subsequently to the yaw steering command formulation circuitry in the autopilot. For example, should the crab angle existing at the altitude trip point be in excess of the 8 degree limit established by the dead-zone translating circuitry 22, the output from mixer 24 comprises an 8 degree step function. For existing crab angles at ALIGN mode trip point less than the 8° limit, the output from mixer 24 is a step function defined by the experienced crab angle per se. Thus, upon the trip point being experienced, mode switch 25 goes to ALIGN position to switch the output from mixer 24 to a bandpass filter 27 from which an anticipating cross feed signal is developed for application in the same sense as the lateral accelerometer output signal to the signal mixing means 48 in the overall system of FIG. 5. Bandpass filter 27, with transfer characteristics as indicated in FIG. 1, smooths out the abruptness of the step function applied upon closing of mode switch 25 to provide a smoothly applied and subsequently decaying impulse upon ALIGN mode being initiated as an anticipating wing down command to the FIG. 5 circuitry which formulates the roll steering command in the system autopilot.

The system of the present invention is thus seen to provide a yaw steering command signal to effect a decrab in an aircraft landing maneuver at a predetermined altitude trip point by means establishing a safe command limit in response to which a forward slip maneuver may be realized without dangerously excessive aircraft wing down maneuver. The system further establishes a yaw command signal indicative of aircraft crab angle which is inherently more accurate than that which might be established from compass input information only.

Although this invention has been described with respect to a particular embodiment thereof, it is not to be so limited as changes might be made therein which fall within the scope of the present invention as defined in the appended claims.

We claim:

1. In an automatic control system for aircraft, control means for developing a yaw steering command signal to effect a decrab maneuver of said aircraft upon a predetermined aircraft altitude being experienced, comprising, signal integrating means, a source of course datum signal proportional to the discrepancy between experienced aircraft heading and a preselected heading, a yaw rate sensor producing a signal proportional to angular velocity about the yaw axis of said aircraft, means operative only at aircraft altitudes above said predetermined altitude to apply said course datum signal as input to said signal integrating means to produce an output signal from said integrating means proportional to the average course datum signal applied thereto, means responsive only to aircraft altitudes equal to and less than said predetermined altitude to apply said yaw rate sensor output signal as input to said signal integrating means, output signal mixing means receiving said yaw rate signal and the output signal from said signal integrating means as respective inputs thereto, means selectively responsive to aircraft altitudes equal to and less than said predetermined altitude to apply the output of said output signal mixing means to an output terminal as a yaw command signal, and aircraft yaw steering means responsive to the said yaw command output signal to effect a decrab maneuver of said aircraft.

2. A control system as defined in claim 1 wherein said signal integrating means comprises signal combining means, said course datum signal being applied as a first input to said signal combining means, a signal integrator selectively receiving the output of said signal combining means as input thereto for aircraft altitudes in excess of said predetermined altitude, the output of said signal integrator being applied in a subtractive sense as a second input to said signal combining means, means for applying said yaw rate sensor output signal as input to said signal integrator in lieu of the output of said signal combining means for aircraft altitudes equal to and less than said predetermined altitude, and the output of said signal integrator comprising the output from said signal integrating means.

3. A control system as defined in claim 2 further comprising signal limiting means receiving the output of said signal integrating means and limiting either sense input signal thereto to a predetermined maximum signal amplitude as applied to said output signal mixing means.

4. A control system as defined in claim 3 wherein said signal limiting means comprises means for developing and storing a signal proportional to the average value of the output of said signal integrating means during aircraft altitudes in excess of said predetermined altitude, dead-zone signal translating means receiving the output of said means for developing and storing as an input thereto and providing a unity gain output signal proportional to only those input signals having magnitudes in excess of a predetermined level, further signal mixing means receiving the outputs of said signal integrating means and said dead-zone signal translating means as respective mutually subtractive inputs thereto, and the output of said further signal mixing means being applied to said output signal mixing means.

5. A control system as defined in claim 4 wherein said means for developing and storing comprises a further signal combining means receiving the output of said signal integrating means as a first input thereto, a further signal integrator to which the output of said further signal combining means is selectively applied for aircraft altitudes in excess of said predetermined altitude, the output of said further signal integrating means being applied as a subtractive second input to said further signal integrator, and the output of said further signal integrator being applied as input to said dead-zone signal translating means.

6. A control system as defined in claim 5 wherein said aircraft control system comprises a roll steering command signal computing means, and cross feed signal development means for selectively applying to said roll steering command computing means a cross feed signal with sensing like that of the output of said means for developing and storing and a magnitude like that of the output of said means for developing and storing and not exceeding said predetermined limit magnitude, said cross feed signal being selectively applied at a time corresponding to said predetermined aircraft altitude being experienced.

7. A control system as defined in claim 6 wherein said cross feed signal development means comprises means for subtracting the output of said dead-zone signal translating means from the input signal thereto, and further comprising bandpass filter means through which the output of said means for subtracting is selectively applied to said roll steering command signal computing means.

* * * * *